United States Patent
Fried et al.

(10) Patent No.: US 6,735,192 B1
(45) Date of Patent: May 11, 2004

(54) METHOD AND APPARATUS FOR DYNAMICALLY VARYING A PACKET DELAY IN A PACKET NETWORK BASED ON A LOG-NORMAL DELAY DISTRIBUTION

(75) Inventors: Joseph Fried, Freehold, NJ (US); Wassim A. Matragi, Brooklyn, NY (US); Behrokh Samadi, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/408,771

(22) Filed: Sep. 29, 1999

(51) Int. Cl.$^7$ ............................................... H04L 12/66
(52) U.S. Cl. ................... 370/352; 370/356; 370/493; 370/516; 370/517
(58) Field of Search ........................... 370/235, 352, 370/394, 356, 433, 435, 445, 492, 493, 494, 495, 501, 516, 517; 709/231, 232, 234

(56) References Cited

U.S. PATENT DOCUMENTS

| | | | | |
|---|---|---|---|---|
| 5,343,465 A | * | 8/1994 | Khalil | 370/232 |
| 5,381,404 A | * | 1/1995 | Sugano et al. | 370/238 |
| 5,996,018 A | * | 11/1999 | Duault et al. | 709/234 |
| 6,157,653 A | * | 12/2000 | Kline et al. | 370/412 |
| 6,175,871 B1 | * | 1/2001 | Schuster et al. | 709/231 |
| 6,259,677 B1 | * | 7/2001 | Jain | 370/252 |
| 6,360,271 B1 | * | 3/2002 | Schuster et al. | 709/231 |
| 6,366,959 B1 | * | 4/2002 | Sidhu et al. | 709/231 |
| 6,434,606 B1 | * | 8/2002 | Borella et al. | 709/214 |

OTHER PUBLICATIONS

Lucas, M. T. et al "Statistical Characterization of Wide–Area IP Traffic" Computer Communications and Networks, IEEE, Sep. 22–25, 1997, pp. 442–447.*

* cited by examiner

*Primary Examiner*—Chi Pham
*Assistant Examiner*—Anh-Vu H Ly

(57) ABSTRACT

A method and apparatus are disclosed for dynamically adapting the play-out delay for voice packets transmitted over a local area network using the Ethernet standard as an access mechanism. It has been observed that the distribution of voice packet delays in a LAN (shared by voice and data traffic) follows a log-normal distribution. An adaptive algorithm is disclosed to estimate the parameters of the log-normal distribution and to apply a dynamic play-out delay to improve the quality of packetized voice conversations, quantified by minimum delay and packet loss. For example, the size, B, of the play-out buffer can be established to ensure that the packet loss does not exceed one percent (1%). The distribution parameters are continuously updated and the size of the play-out buffer, B, is modified at the beginning of every calibration interval according to the illustrative 99% percentile of the delay distribution.

33 Claims, 7 Drawing Sheets

METHOD AND APPARATUS FOR DYNAMICALLY VARYING A PACKET DELAY IN A PACKET NETWORK BASED ON A LOG-NORMAL DELAY DISTRIBUTION

FIELD OF THE INVENTION

The present invention relates to packet voice communication systems, and more particularly, to method and apparatus for enhancing the quality of service of packetized voice conversations over a Local Area Network (LAN), when the Ethernet standard is used as an access mechanism.

BACKGROUND OF THE INVENTION

Originally, local area networks were designed for interconnecting data terminals, such as work stations and servers, for the transmission of data. Increasingly, however, local area networks are utilized to transmit voice signals between voice stations that are connected to the LAN using packet phone adapters (PPAs). In the packet-based environment of a LAN, audio information is transmitted in packets. The voice station associated with the calling party samples the voice of the speaker, converts the sampled voice signal from an analog to digital format, organizes the sampled digital signal into packets, implements compression techniques, if desired, and then transmits the signal over the Ethernet medium.

Local area networks based on the 802.3 IEEE standard use a Carrier Sense Multiple Access/Collision Detection (CSMA/CD) mechanism to enable multiple stations to share the same infrastructure, such as a shared segment or a hub. A station connected to the LAN and having a packet to send listens to the shared medium. If the channel is clear (there are no other stations transmitting), the station under consideration starts transmission, while listening at the same time. If the station detects a collision while transmitting, the station jams the medium, aborts the transmission, and reschedules the transmission for another time.

As a result of this collision detection access mechanism, packets can incur random and bursty transmission delays through the LAN, which can adversely affect the quality of the voice conversation. At the voice station associated with the called party, the voice packets are passed to a decoder. Generally, the decoder expects to receive packets from the network interface and plays them out as soon as they are received. However, due to the potential random delays, the decoder might not receive a packet at the appropriate time. In this situation, the packet is considered lost and the decoder might play out silence or interpolate a sample from two previous packets. Frequent packet losses result in poor voice quality.

A number of techniques have been proposed or suggested to compensate for such transmission delays and improve the quality of service in packet-based telephony. One such technique is the build-out delay technique where the receiver waits for an initial fixed period (the "build-out" delay) after receiving the first packet of a call before reconstructing and replaying the audio signal from the received packets. During reconstruction, the receiver can use sequence numbers (when available) from the received packets to synchronously schedule the received packets for play-out.

Unfortunately, the use of sequence numbers, by themselves, and a fixed build-out delay for the entire call does not eliminate the distortion in the packet voice system due to packet delays and excessive packet losses. Thus, it has been proposed to dynamically change the build-out delay throughout the duration of the call. For example, the build-out delay change can take place at the beginning of a talk-spurt (a talk-spurt is a sequence of audio packets between two silence durations).

It is important to determine the build-out delay that results in the desired packet loss. There is obviously a trade-off between delay and packet loss. In one extreme, the build-out delay can be set to a large value, allowing the receiver to accumulate all the voice packets and resulting in zero packet loss. However, a large build-out delay as such eliminates the interactive nature of the voice conversation. In the other extreme, the build-out delay can be set to zero resulting in a larger than desired packet loss. Accordingly, it is important to find the minimum value of the build-out delay that will result in the maximum acceptable packet loss. This is not an easy task, especially in a shared LAN (using the Ethernet standard as an access mechanism) where the random delays depend on many factors such as the number of stations connected to the LAN, the intensity and mix of the traffic generated by these stations, the size of packets, and the distance between the stations trying to communicate.

The techniques that have been proposed to compensate for the variable delays have been generic in nature and did not take into consideration the nature and the distribution of the variable delays. A need therefore exists for a technique that compensates for such transmission delays based on the delay distribution. A further need exists for a method and apparatus that dynamically improves the voice quality under varying traffic conditions in a LAN environment. Yet another need exists for a method and apparatus for dynamically adjusting a jitter buffer depending on network delays in a LAN environment.

SUMMARY OF THE INVENTION

Generally, a method and apparatus are disclosed for dynamically adapting the play-out delay for voice packets as a function of the estimated packet delays in a Local Area Network using the Ethernet standard as an access mechanism, to improve the quality of packetized voice conversations. The present invention minimizes both the end-to-end voice delay and loss of packets due to late arrivals relative to their play-out time.

The present invention recognizes that packet delays in a LAN follow a log-normal distribution, and it also recognizes that the delays do not exhibit correlation, and therefore the marginal delay distribution is adequate in representing the actual delays. The present invention provides an adaptive play-out process to estimate the distribution of the packet delays using a log-normal distribution and applies a dynamic mechanism to adapt the play-out delay to the varying traffic conditions on the network.

The log-normal distribution is characterized by its mean and variance, obtained by evaluating packet arrival delays. According to another aspect of the invention, the size of the play-out buffer and the resulting packet loss rate, can be determined to provide a desired quality of service. In an illustrative implementation, the size, B, of the play-out buffer is established to ensure that the packet loss does not exceed one percent (1%). This illustrative packet loss-rate of 1% is deemed to be acceptable for the majority of codecs. The distribution parameters, such as average delay and standard deviation, are continuously updated and the play-out buffer B, is modified dynamically according to the illustrative $99^{th}$ percentile of the delay distribution.

A more complete understanding of the present invention, as well as further features and advantages of the present

DETAILED DESCRIPTION

Figure 1:
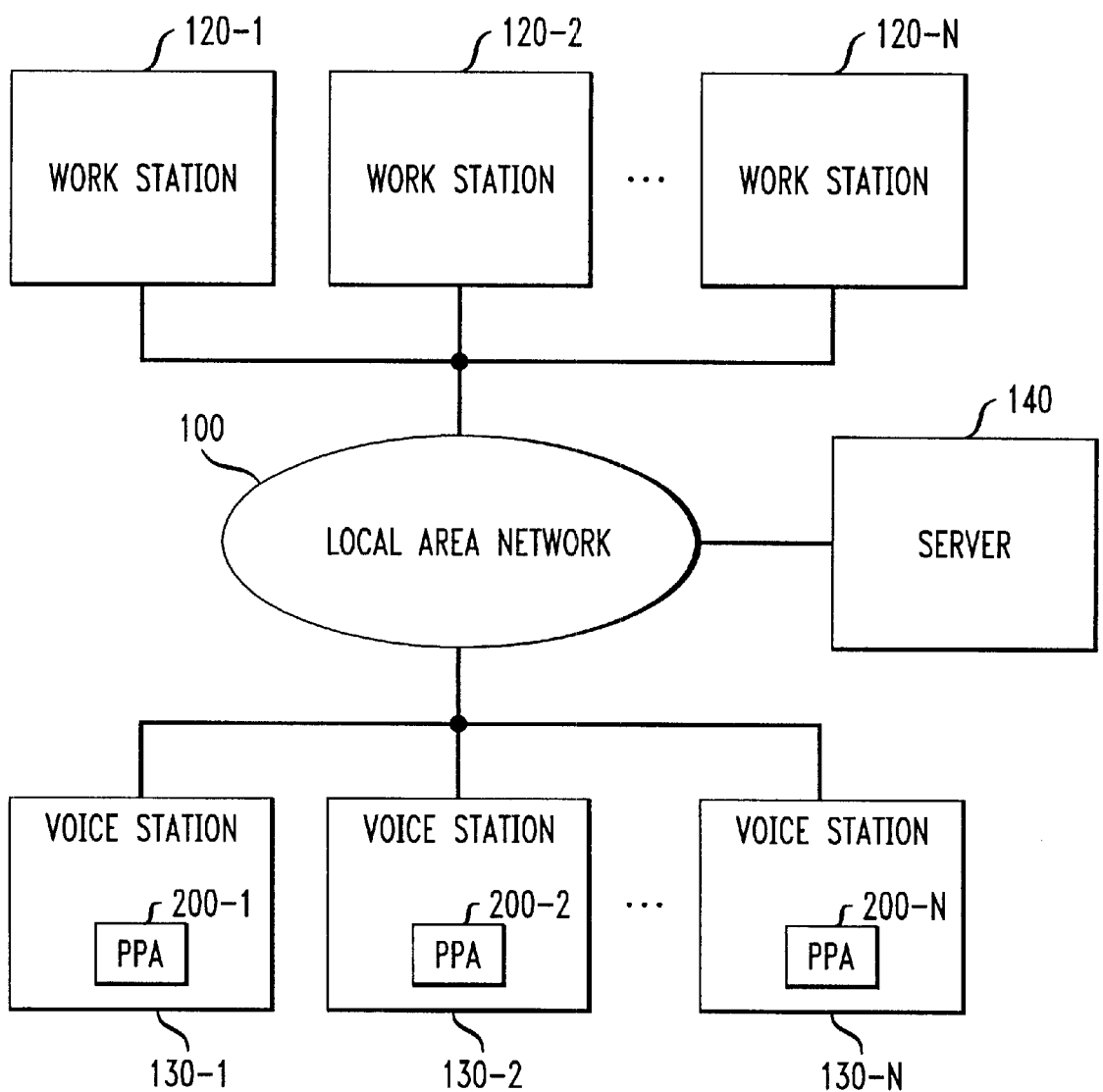
FIG. 1 illustrates a conventional local area network for interconnecting a plurality of data and voice stations.

FIG. 1 illustrates a conventional local area network 100 that interconnects data terminals, such as work stations 120-1 through 120-N (hereinafter, collectively referred to as work stations 120) and a server 140, and voice stations 130-1 through 130-N (hereinafter, collectively referred to as work stations 130), for the transmission of data and voice. As previously indicated, the local area network 100 utilizes the Ethernet standard as an access mechanism.

As shown in FIG. 1, each voice station 130 is connected to the LAN 100 by means of a packet phone adapter 200-1 through 200-N (hereinafter, collectively referred to as packet phone adapters (PPA) 200), discussed further below in conjunction with FIG. 2. While the packet phone adapters 200 are illustrated in FIG. 1 as being integrated with the voice stations 130, the packet phone adapters 200 may be embodied as remote devices, as would be apparent to a person of ordinary skill in the art.

Figure 2:
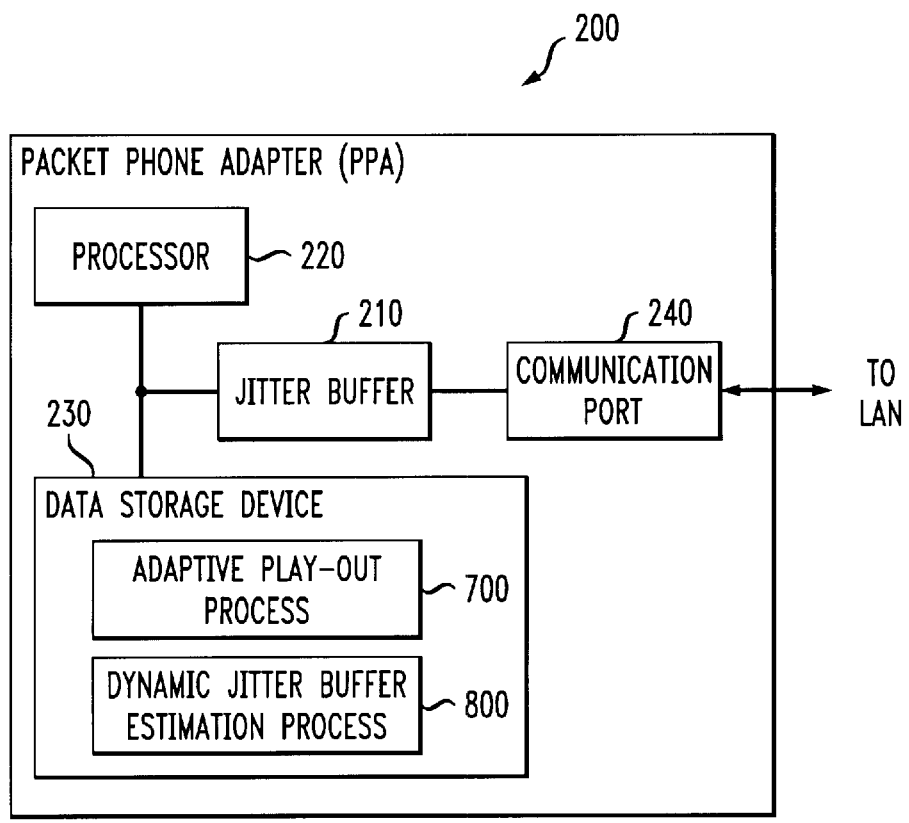
FIG. 2 is a schematic block diagram of an exemplary packet phone adapter of FIG. 2.

FIG. 2 is a schematic block diagram of an exemplary packet phone adapter 200. The packet phone adapters 200 perform encoding and decoding of voice packets, and determine the delay for each packet by calculating the difference between the transmit time and the receive time. Generally, the packet header will include a time-stamp indicating the transmit time. According to a feature of the invention, each packet phone adapter 200 includes a play-out buffer 210 that dynamically adapts the play-out delay for voice packets as a function of the estimated packet delays over the LAN 100 to minimize the end-to-end voice delay and loss of packets due to late arrivals relative to their play-out time. The play-out buffer 210 artificially delays the received voice packets before passing them to the decoder.

In addition, each packet phone adapter 200 includes certain standard hardware components, such as a processor 220, a data storage device 230, and a communications port 240. The processor 220 can be linked to each of the other listed elements, either by means of a shared data bus, or dedicated connections, as shown in FIG. 2. The communications port 240 connects the packet phone adapter 200 to the LAN 100.

The data storage device 230 is operable to store one or more instructions, discussed further below in conjunction with FIGS. 7 and 8, which the processor 220 is operable to retrieve, interpret and execute in accordance with the present invention. As previously indicated, the amount that voice packets are delayed will vary depending on many factors, including the number of stations connected to the LAN, the intensity and mix of the traffic generated by these stations, the size of packets, and the distance between the stations trying to communicate.

The present invention recognizes that packet delays in a local area network 100 follow a log-normal distribution, especially when voice is mixed with data. As shown in FIG. 2, the packet phone adapter 200 includes an adaptive play-out process 700, discussed further below in conjunction with FIG. 7. Generally, the adaptive play-out process 700 estimates the packet delays using a log-normal distribution and applies a dynamic play-out delay to improve the quality of service of packetized voice conversations. In addition, the packet phone adapter 200 includes a dynamic play-out buffer estimation process 800, discussed further below in conjunction with FIG. 8, that dynamically determines the size of the play-out buffer 210 based on the log-normal distribution.

Figure 3:
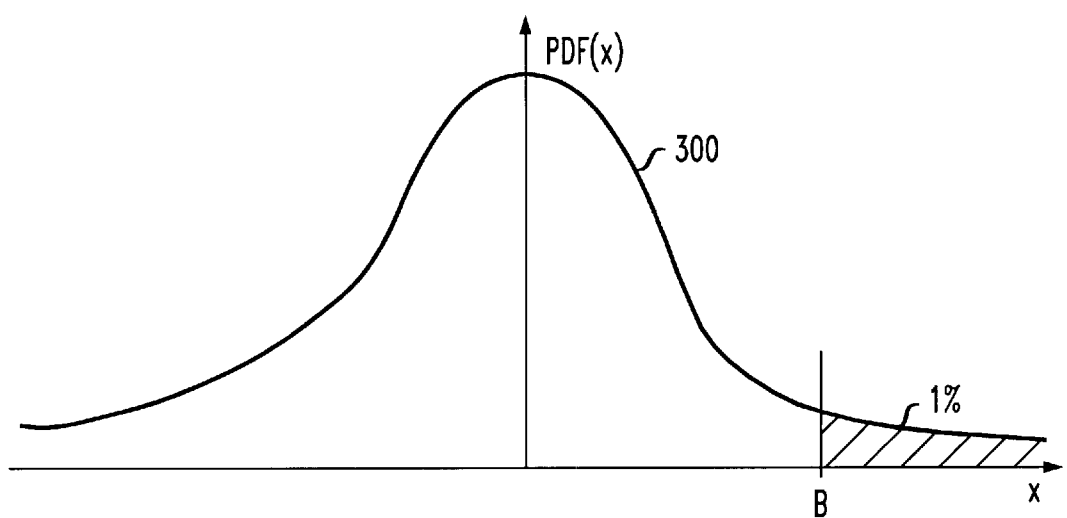
FIG. 3 illustrates a typical log-normal distribution and the 99$^{th}$ percentile for packet delay through the representative local area network of FIG. 1.

FIG. 3 illustrates a log-normal distribution 300 for the representative delay in the local area network 100 of FIG. 1. The log-normal distribution is characterized by its mean and variance, obtained by evaluating packet arrival delays. According to a further feature of the present invention, the size of the play-out buffer can be established to provide a desired quality of service. In the illustrative implementation, shown in FIG. 3, the size of the play-out buffer, B, is established such that the packet loss does not exceed one percent (1%). The information is not known a priori, and the dynamic play-out buffer estimation process 800 calculates the distribution parameters from the received delay samples. As discussed below in conjunction with FIG. 8, the dynamic play-out buffer estimation process 800 uses the log-normal distribution and the determined parameters to calculate the 99% percentile of the distribution. The dynamic play-out buffer estimation process 800 continuously updates the distribution parameters and the jitter size, B, is modified at the beginning of every interval according to the 99% percentile of the delay distribution.

Thus, in one implementation, adaptive play-out delay variations take effect at the play-out time of the first packet of a talk spurt, and the play-out delays are adjusted during the silence periods. As previously indicated, a talk-spurt is a sequence of audio packets between two silence durations.

Figure 4:
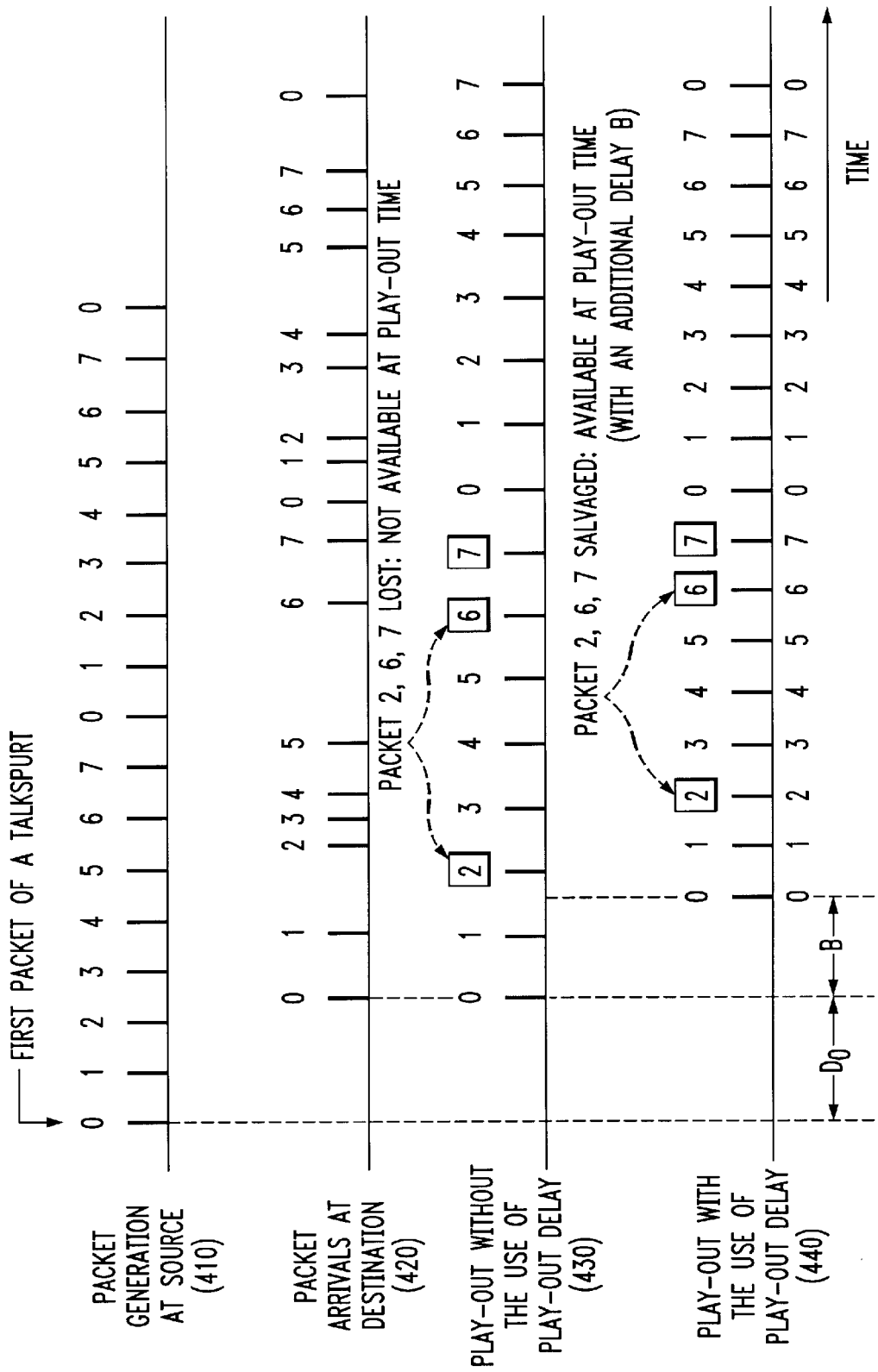
FIG. 4 provides a set of time-lines for illustrating the use of a variable play-out delay, B, in accordance with the present invention.

FIG. 4 provides a set of time-lines for illustrating the use of a variable play-out delay, B, in accordance with the present invention. Time-line 410 in FIG. 4 shows an illustrative talk-spurt comprising a number of packets. A transmitting voice station creates a packet, having an assigned sequence number, k, where $0 \leq k \leq 7$.

Time-line 420 shows the illustrative talk-spurt arriving at a receiving voice station, without any delay compensation. Each packet arrives in the order it is transmitted. As can be observed from time-line 420, there is a variable delay in the arrival time of each packet. The parameter $D_0$ is defined as the total network delay of the first packet (k=0) of a talk-spurt. The parameter $D_0$ includes both fixed and variable delays. The parameter B is defined as the play-out delay. In the exemplary packet arrival scenario of time-line 420, the packets with sequence numbers of 2, 6 and 7 (hereinafter referred to as packets 2, 6 and 7, respectively)

have been lost (do not arrive or are not available at play-out time due to delay).

For illustrative purposes, time-line 430 shows the effect on play-out of received packets if a variable play-out delay was not provided on the received packet stream shown in time-line 420. The receiving voice station 130 begins play-out upon arrival, in the order received at periodic time intervals, if the packet is available. Since packets 2, 6 and 7 were lost, there will generally be a gap in the play-out at time intervals 2, 6 and 7. A conventional receiver might introduce "fill" packets, e.g., low-level noise or extrapolated speech, into the gap intervals of the play-out stream.

Time-line 440 illustrates the advantage of using a variable play-out delay during play-out. Again, the receiving voice station 130 begins play-out after the total network delay (marked by receipt of the first packet) plus the play-out delay, B. Packets are played out of the play-out buffer 210 in conjunction with the most recent sequence number at associated time intervals. Thus, as a result of the play-out delay, packet 2 will now be available at time interval 2 (which has shifted by an amount equal to the play-out delay, B, relative to the time-line 430). Likewise, at the appropriate time intervals each of the received packets are played-out and no packets are lost. Packets continue to be played out in the correct sequence until the play-out buffer 210 is exhausted.

Figure 5:
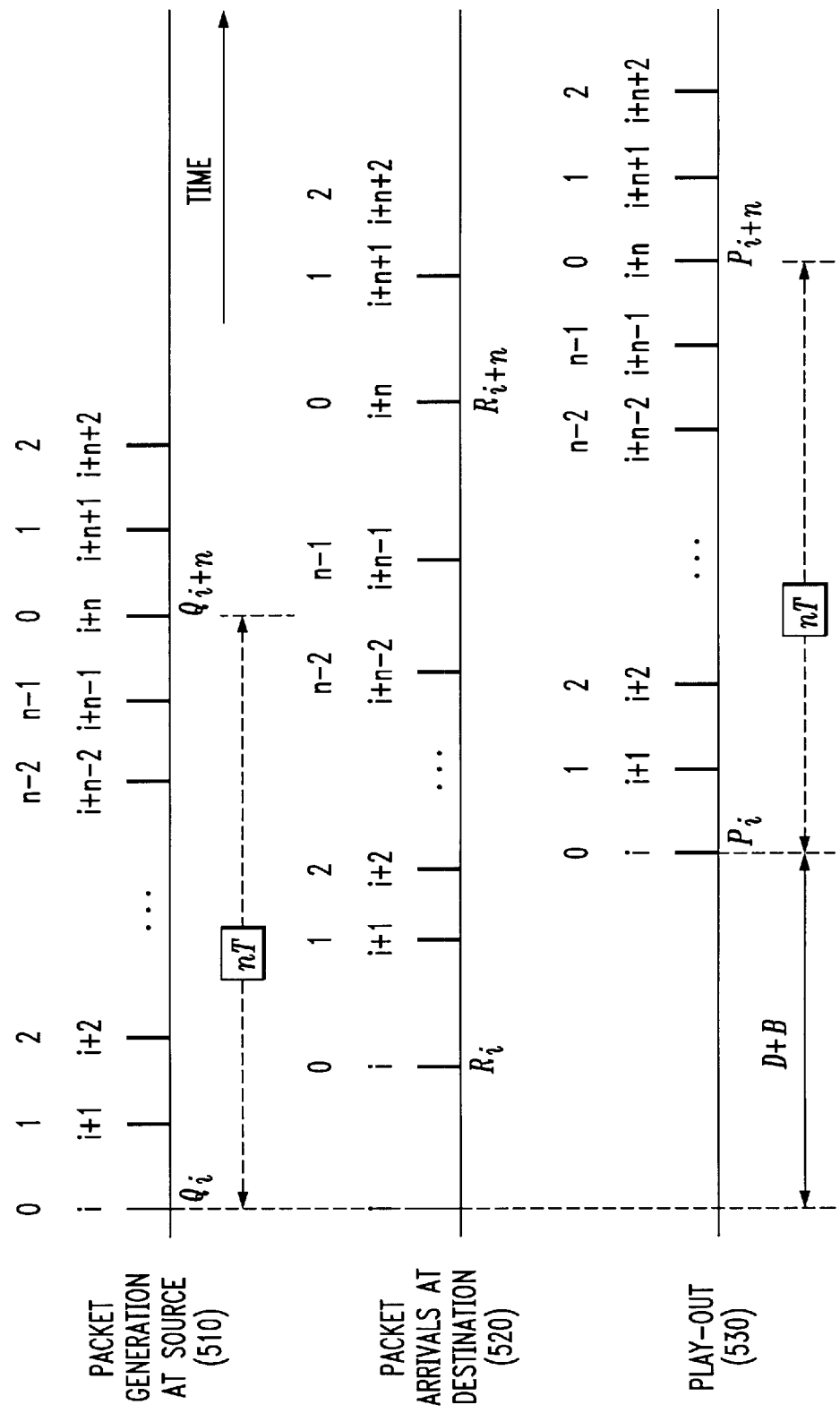
FIG. 5 provides a set of time-lines for illustrating the notations for packet flow timing.

A set of time-lines 510, 520, 530 are shown in FIG. 5 in order to illustrate the notations for packet flow timing. Packet i refers to the $i^{th}$ packet of a talk-spurt. Let the first packet of a talk-spurt be defined as the $0^{th}$ packet. In addition, T=voice packetization interval, such as 30 milliseconds;

B=initial play-out delay;

$C_i$=source generation time of packet i, $R_i$=destination receive time of packet, i;

$P_i$=scheduled play-out time of packet, i; and $D_i$=total network delay of packet i.

With the above definition, the following equations follow:

$C_i = C_0 + iT$, $R_i = C_i + D_i = C_0 + iT + D_i$, $P_0 = R_0 + B = C_0 + D_0 + B$, and $P_i = P_0 + iT = C_0 + D_0 + B + iT$.

As previously indicated, the present invention improves the quality of packet-based telephony by using a play-out delay that is determined as a function of network traffic delay characteristics. In other words, voice packet play-out delay is adapted as a function of the estimated packet delays over the network to minimize end-to-end voice delay and loss of packets due to late arrivals relative to their play-out times.

Figure 6:
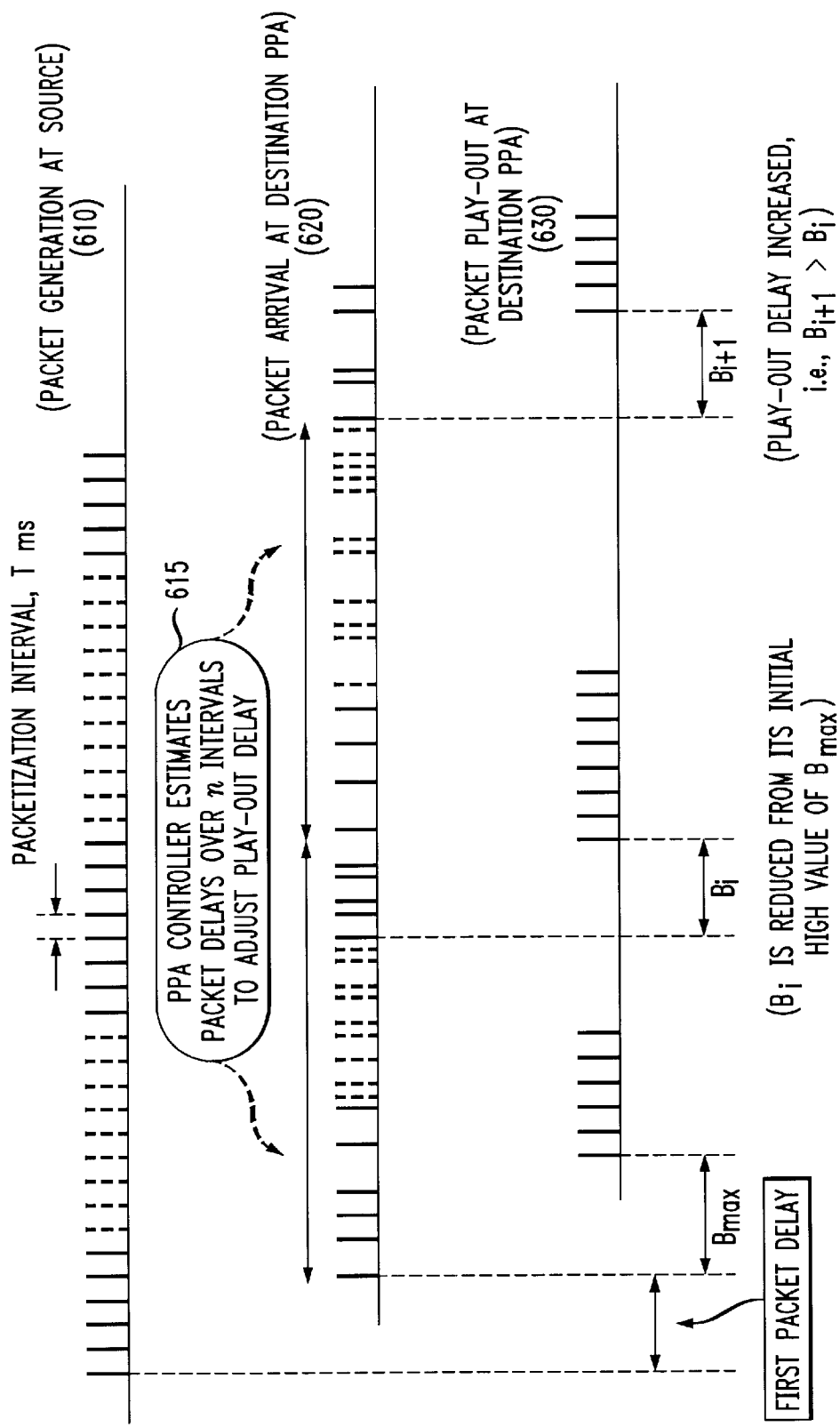
FIG. 6 provides a further set of time-lines for illustrating the use of a variable play-out delay, B, in accordance with the present invention.

FIG. 6 illustrates the adaptive play-out delay techniques of the present invention. Once a new call has been established between a first calling voice station 130 and a second called voice station 130 over the LAN 100, the calling voice station 130 begins to generate voice packets as illustrated by time-line 610 of FIG. 6. Each packet is generated in a packetization interval, T. A period of time later, these packets start to arrive at the called voice station 130 as illustrated by time-line 620 of FIG. 6. In accordance with the inventive concept, the called voice station 130 applies adaptive play-out delays as illustrated by time-line 630 of FIG. 6. As can be observed from time-line 630, the play-out delay is varied dynamically at the beginning of each interval by varying a play-out delay $B_i$. We should note here that the algorithm can be applied at the beginning of every talkspurt, or alternatively once every "n" talkspurt, depending on the processing power of the microcontroller in the PPA. As shown in FIG. 6, $B_i$ denotes the play-out delay applied at the beginning of talk-spurt, i.

Figure 7:
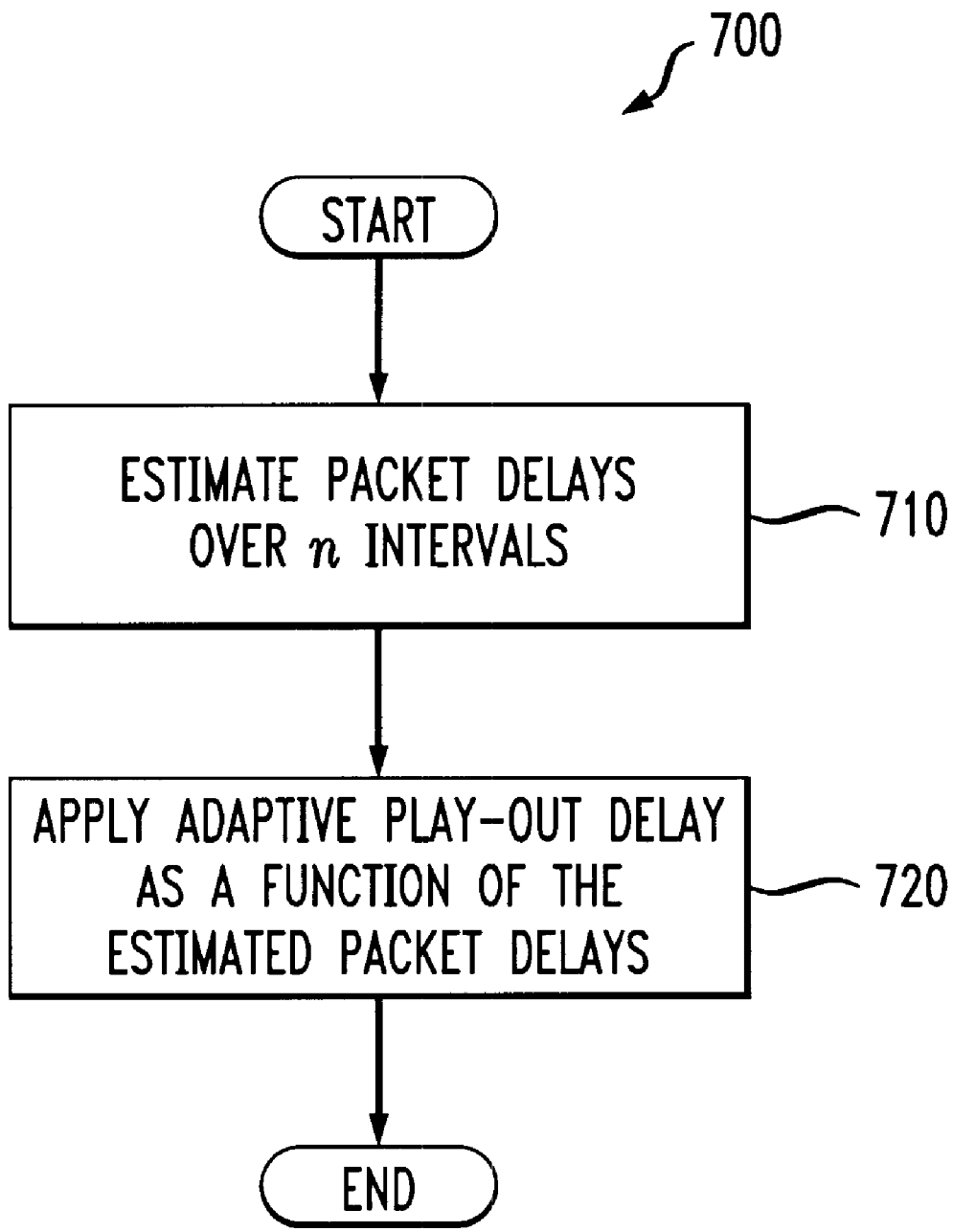
FIG. 7 is a flow chart describing an exemplary adaptive play-out process implemented by the packet phone adapters of FIG. 2.

FIG. 7 is a flow chart describing an exemplary adaptive play-out process 700 implemented by the packet phone adapters 200 of FIG. 2. The packet phone adapters 200 is suitably programmed to carry out the below-described methods using conventional programming techniques. As shown in FIG. 7, the adaptive play-out process 700 initially estimates packet delays over k intervals of received packets during step 710. (also shown at stage 615 of FIG. 6).

The adaptive play-out process 700 then uses the estimated packet delays during step 720 to adjust the play-out delay, $B_i$. In one implementation, the adaptive play-out process 700 executes the dynamic play-out buffer estimation process 800, discussed below in conjunction with FIG. 8, during step 720 to adjust the play-out delay, $B_i$.

For a more detailed discussion of performance requirements for networks that transport voice packets, see, for example, John G. Gruber and Nguyen H. Le, "Performance Requirements for Integrated Voice/Data Networks," by *IEEE Journal on Selected Areas in Communications*, Vol. SAC-1, No. 6, December, 1983, incorporated by reference herein.

In the following discussion, the following notations are utilized:

$Q_j$=transmit time of the jth packet;

$R_j$=receive time of the jth packet;

$X_j$=absolute delay of jth packet, $X_j = R_j - Q_j$;

$B_c$=estimate of play-out delay based on received packets of previous calls;

B=current estimate of play-out delay of current call $D_c$=estimate of fixed delay based on received packets of previous calls;

D=current estimate of fixed delay based on current call $\bar{d}$=estimate of the average variable delay $T_{max}$=Time-out parameter for adjusting the play-out buffer $S^2$=current estimate of the variance of $\bar{d}$.

Figure 8:
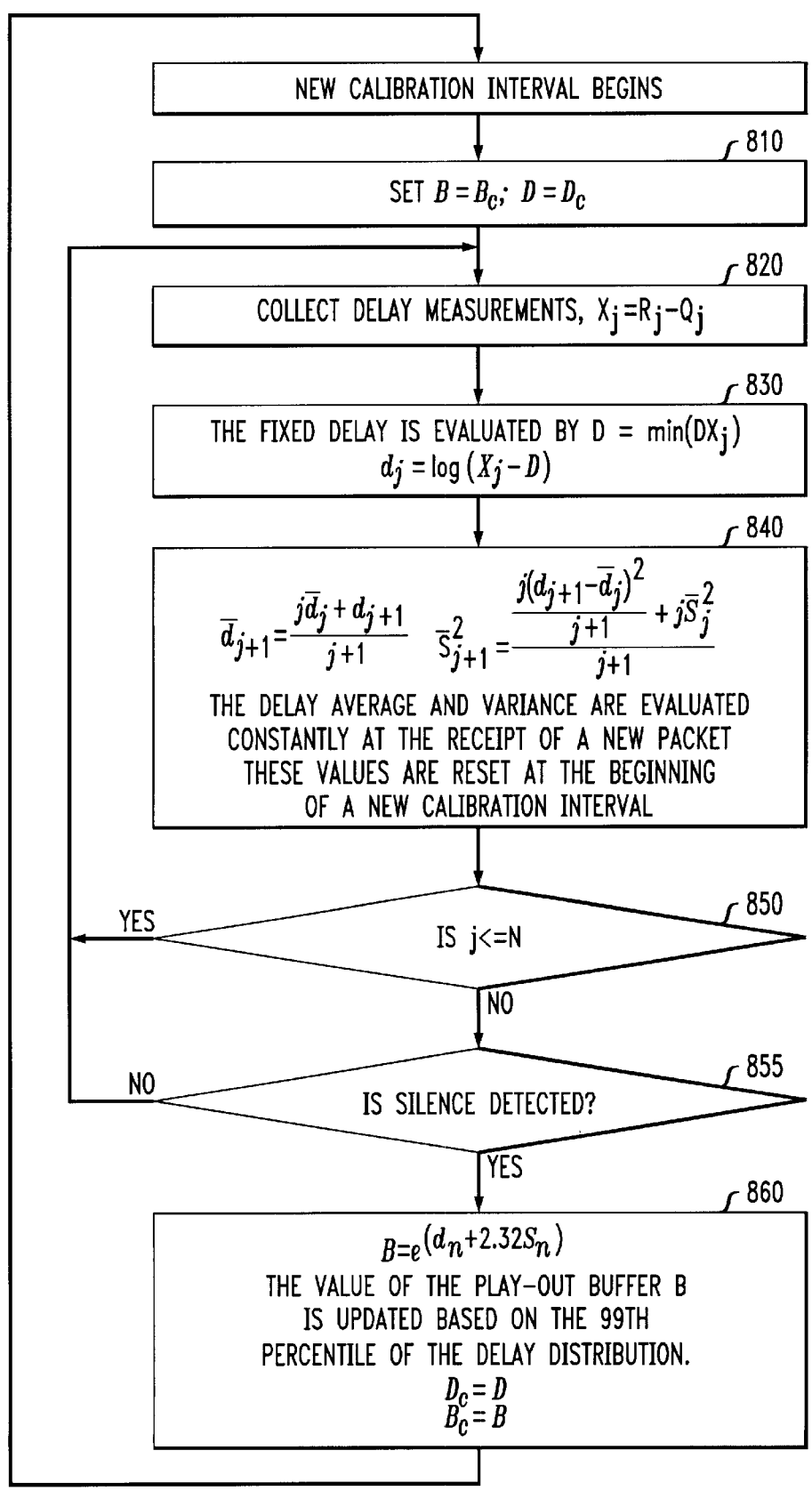
FIG. 8 is a flow chart describing an exemplary dynamic play-out buffer estimation process implemented by the packet phone adapters of FIG. 2.

In addition, in the discussion of FIG. 8, the index j indicates the previous packet, while j+1 indicates the current packet. It should be noted that there may be background music or noise on the line sometimes, causing the talk-spurts to go on for long periods (tens of seconds or longer). In such cases, the time out parameter $T_{max}$ (on the order of one second) may be applied for readjusting the play-out delay in mid-talk-spurt in accordance with network delay estimates.

As previously indicated, FIG. 8 is a flow chart describing an exemplary dynamic play-out buffer estimation process 800 implemented by the packet phone adapters 200 of FIG. 2. The packet phone adapters 200 is suitably programmed to carry out the methods of FIG. 8 using conventional programming techniques. As shown in FIG. 8, the dynamic play-out buffer estimation process 800 initializes variables B and D during step 810. In particular, the variable B is set equal to the value of $B_c$ and the variable D is set equal to the value of $D_c$. The values of Bc and Dc are calculated from previous calls. $B_c$ is a statistic tracked by each packet phone adapter 200 and there is a different $B_c$ value for each packet source that the packet phone adapter 200 is communicating with. For simplicity, it is assumed that the packet phone adapter 200 maintains a table that associates different $B_c$ values with particular source voice stations 130.

Thereafter, the dynamic play-outbuffer estimation process 800 collects measurements during step 820 for the packet delays for the next N consecutive received packets. In particular, the variable $X_j$ is evaluated during step 820, where $X_j=R_j-Q_j$. The fixed delay is then measured during step 830 by selecting the minimum value of $\{D \text{ and } X_j\}$. The variable delay $d_j$ is calculated by substracting the fixed delay from the absolute delay, $d_j=\log(X_j-D)$.

The delay average, $\bar{d}$, and delay variance, $\bar{S}^2$, are evaluated constantly during step 840, at the receipt of a new packet, as follows:

$$\bar{d}_{j+1} = \frac{j\bar{d}_j + d_{j+1}}{j+1}$$

$$\bar{S}^2_{j+1} = \frac{\frac{j(d_{j+1}-d_j)^2}{j+1} + j\bar{S}^2_j}{j+1}.$$

The delay average and delay variance values are reset at the beginning of each cycle. A test performed during step 850 ensures that steps 820 through 840 are performed continuously, for as long as the current packet number, j, is less than or equal to a predefined interval value, N which represents the number of voice packets transmitted in an interval of n cycle. We define one cycle to be a talkspurt and silence Once it is determined during step 850 that the current packet number, j, is no longer less than or equal to the packet estimation interval value, N, then a further test is performed during step 855 to determine if silence is detected, confirming the end of the cycle. If it is determined during step 855 that silence is not yet detected then program control returns to step 820 and continues in the manner described above. If, however, it is determined during step 855 that silence is detected then the value of the play-out buffer, B, 210 is updated during step 860 based on the 99$^{th}$ percentile of the delay distribution, as follows:

$B=e^{(d_n+2.32S_n)}$; and $B_c=B$.

The value of B determined above reflects the 99$^{th}$ percentile of a log-normal distribution with an average $d_N$ and a standard deviation $S_N$. In case a coder more tolerant to packet loss is being used, then the acceptable packet loss can be relaxed to, say 5% from 1%, and the 95$^{th}$ percentile of the delay distribution can be determined easily from the equation above by changing the number 2.32 to 1.64.

It is to be understood that the embodiments and variations shown and described herein are merely illustrative of the principles of this invention and that various modifications may be implemented by those skilled in the art without departing from the scope and spirit of the invention.

We claim:

1. A method for use in a packet receiver, comprising the steps of:
   receiving a plurality of packets; and
   applying a play-out delay before reproducing said packets, wherein said play-out delay is based on a log-normal delay distribution.

2. The method according to claim 1, wherein said applying step establishes a play-out delay value to achieve a desired quality of service.

3. The method according to claim 1, wherein said applying step establishes a play-out delay value to ensure that a packet loss value does not exceed predefined percentage of all transmitted packets.

4. The method according to claim 1, further comprising the step of updating a characterization of said log-normal distribution.

5. The method according to claim 1, wherein said play-out delay is modified at the beginning of each talk spurt according to the delay distribution.

6. The method according to claim 1, wherein said applying step is performed at the start of each group of said packets.

7. The method according to claim 6, wherein said group of said packets represents a number of talk-spurts.

8. The method according to claim 6, wherein said group of said packets represents a number of talk-spurts and said applying step applies a play-out delay to packets within said talk-spurt if a talk-spurt duration exceeds a predefined value.

9. The method according to claim 1, wherein said packets are played out in sequence.

10. The method according to claim 1, wherein said packets comprise voice data.

11. The method according to claim 1, wherein said packets comprise voice data and said method further comprises the steps of detecting the beginning of talk-spurts in said received packets and applying said play-out delay at the start of detected talk-spurt.

12. The method according to claim 1, wherein said receiver is connected to a local area network (LAN).

13. A method for use in a packet receiver, comprising the steps of:
   receiving a plurality of packets;
   estimating a packet delay associated with said received packets;
   using said estimated packet delay values to characterize a log-normal delay distribution; and
   applying a play-out delay before reproducing said packets, wherein said play-out delay is based on said log-normal delay distribution.

14. The method according to claim 13, wherein said packet delay is estimated by accessing a time-stamp in a header of said packets.

15. The method according to claim 13, wherein said applying step establishes a play-out delay value to achieve a desired quality of service.

16. The method according to claim 13, wherein said applying step establishes a play-out delay value to ensure that a packet loss value does not exceed a predefined percentage of all transmitted packets.

17. The method according to claim 13, further comprising the step of updating a characterization of said log-normal distribution.

18. The method according to claim 13, wherein said play-out delay is modified at the beginning of talk-spurts according to the delay distribution.

19. The method according to claim 13, wherein said applying step is performed at the start of each group of said packets.

20. The method according to claim 19, wherein said group of said packets represents a number of talk-spurts.

21. The method according to claim 19, wherein said group of said packets represents a number of talk-spurts and said applying step applies a play-out delay to packets within said talk-spurt if a talk-spurt duration exceeds a predefined value.

22. The method according to claim 13, wherein said packets are played out in sequence.

23. The method according to claim 13, wherein said packets comprise voice data.

24. The method according to claim 13, wherein said packets comprise voice data and said method further comprises the steps of detecting talk-spurts in said received packets and applying said play-out delay at the start of a talk-spurt.

25. A packet receiver, comprising:

a communication port for receiving a plurality of packets; and a play-out buffer for applying a play-out delay before reproducing said packets, wherein said play-out delay is based on a log-normal delay distribution.

26. The packet receiver according to claim 25, wherein said play-out buffer establishes a play-out delay value to achieve a desired quality of service.

27. The packet receiver according to claim 25, further comprising a processor configured to update a characterization of said log-normal distribution.

28. The packet receiver according to claim 25, wherein said play-out delay is modified at the beginning of talk-spurts according to the delay distribution.

29. The packet receiver according to claim 25, wherein said packets comprise voice data.

30. The packet receiver according to claim 25, wherein said receiver is connected to a local area network (LAN).

31. The packet receiver according to claim 25, wherein said play-out buffer establishes a play-out delay value to ensure that a packet loss value does not exceed predefined percentage of all transmitted packets.

32. The packet receiver according to claim 25, wherein said packets comprise voice data and said packet receiver further comprises means for detecting talk-spurts in said received packets and applying said play-out delay in said play-out buffer at the start of talk-spurts.

33. A packet receiver, comprising:

a communications port for receiving a plurality of packets;

a processor for estimating a packet delay associated with said received packets and for using said estimated packet delay values to characterize a log-normal delay distribution; and a jitter buffer for applying a play-out delay before reproducing said packets, wherein said play-out delay is based on said log-normal delay distribution.

* * * * *